Aug. 5, 1941.  W. H. FRANK ET AL  2,251,403
ELECTRICAL DISTRIBUTION SYSTEM
Filed March 27, 1939
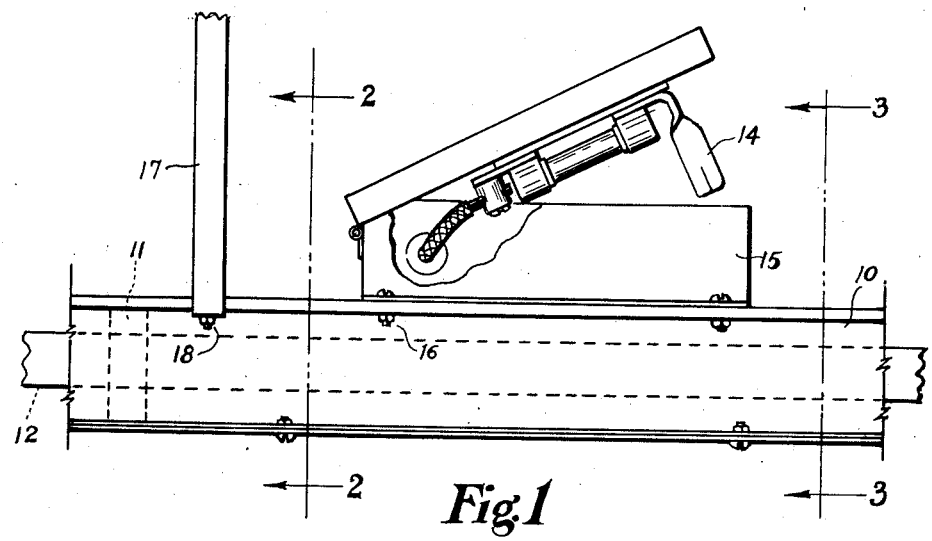
Fig.1
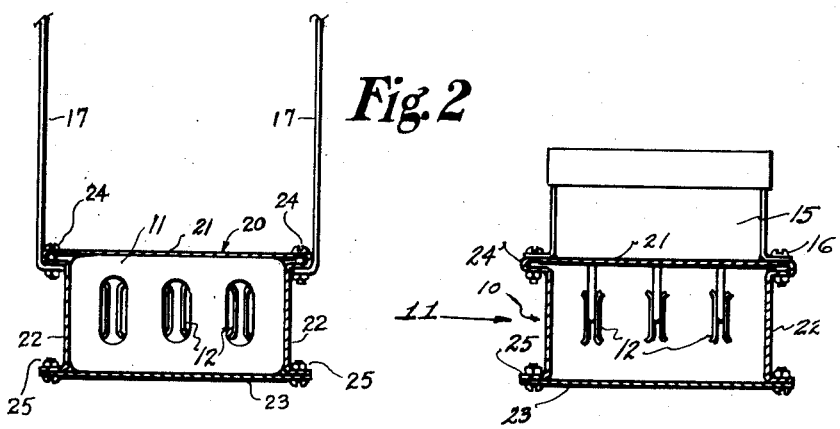
Fig.2
Fig.3
INVENTORS
William H. Frank
BY Joseph W. Harper
Daniel G. Cullen
ATTORNEY.

Patented Aug. 5, 1941

2,251,403

UNITED STATES PATENT OFFICE 2,251,403

ELECTRICAL DISTRIBUTION SYSTEM

William H. Frank and Joseph W. Harper, Detroit, Mich., assignors to Bulldog Electric Products Company, Detroit, Mich., a corporation of West Virginia Application March 27, 1939, Serial No. 264,354

2 Claims. (Cl. 173—334.1)

This application relates to electrical distribution systems, particularly to systems of the bus duct and plug type, and is a continuation in part of a prior application Serial No. 692,910, filed October 9, 1933, now Patent No. 2,041,675, of May 19, 1936.

The subject matter hereof, in part, has been disclosed in the following applications as originally filed; Serial No. 692,910 of October 9, 1933, now Patent No. 2,041,675, of May 19, 1936; Serial No. 61,290 of January 29, 1936, now Patent No. 2,146,812 of February 14, 1939; Serial No. 183,-992 of January 8, 1938, which became abandoned on or about February 12 1940.

A bus duct system of the character under consideration comprises a sheet metal duct containing bus bars and to which are secured plugs having contacts for engaging the bus bars.

The duct or casing, made of sheet metal, is provided with flanges. If desired, and as a specific improvement, the flanges may be midway of the sides of the duct, which is made symmetrical, as shown in the aforesaid patent, Figs. 1–5, whereby the plugs may be mounted on either of the two opposite sides of the duct. However, if mounting on both sides is not necessary, the flanges need not be so located, and may be nearer one side of the duct than the other, to receive plugs on one side only of the duct, as disclosed in the appended drawing in which—

Fig. 1 is a longitudinal view of a fragment of bus duct showing the duct, the bus bars therein, a branch circuit plug, and a support for the duct;

Figs. 2 and 3 are sections on lines 2—2 and 3—3 of Fig. 1 and illustrate one specific cross section of duct;

The bus duct system shown in Figs. 1 to 3 includes a sheet metal duct, referenced generally 10, within which, at longitudinally spaced points, are insulators 11 through which pass bus bars 12 for engagement by prongs 14 of branch circuit plugs, referenced generally 15, secured to the duct as by the screws 16, with the prongs passing through holes, not shown, of the sheet metal casing or duct.

The duct is supported from fixed structure as by means of supporting straps 17 secured thereto through the screws 18.

In the construction of Figs. 1 to 3 the duct includes a U-shaped part 20 having a bight 21 and side members 22, and a cover 23. The intersections between the bight and the side members are defined by beads or flanges 24 to which the supporting straps 17 are secured. The edges of the side members 22 are defined by flanges 25 through which pass screws 26 securing the cover to the side members 22. The flanges 24 and 25 reinforce the duct and its parts at their edges. In addition, they provide formations to which the support 17 and the plugs 15 may be secured. As indicated, these plugs and supports are secured to the flanges 24. However, the duct may be inverted with respect to the supports and plugs so that the supports and plugs are secured directly to the flanges 25 rather than to the flanges 24; similarly, plugs may be secured to flanges 25 and supports to flanges 24; and vice versa.

Now having described the bus duct system hereof, reference should be had to the claims which follow for a determination of the invention herein disclosed.

What we claim is:

1. An electrical distribution system of the bus duct and plug type comprising a longitudinally divided quadrilateral cross section casing or duct of elongated sheet metal casing parts, bus bars in the duct and accessible through holes of the duct, and plugs adapted to be secured to the duct and having prongs entering the duct through the holes thereof and engaging the bus bars, continuous flanges projecting from and extending longitudinally of said duct at the four edges thereof, the flanges being formed to permit plugs and duct supports to be secured directly to them, and to permit duct parts to be intersecured.

2. An electrical distribution system of the bus duct and plug type comprising a longitudinally divided casing or duct of elongated sheet metal casing parts, one of which is U shaped in cross section and the other of which is a flat plate, bus bars in the duct and accessible through holes of the duct, and plugs adapted to be secured to the duct and having prongs entering the duct through the holes thereof and engaging the bus bars, continuous flanges projecting from and extending longitudinally of said U shaped part of the duct at its bight and at its edges, means for securing the flat plate part of the duct to the free edge flanges of the U shaped part of the duct, the flanges being formed to permit plugs and duct supports to be secured directly to them, and to permit duct parts to be intersecured.

WILLIAM H. FRANK.
JOSEPH W. HARPER.